Dec. 24, 1940.   E. O. SCHWEITZER, JR   2,226,021
TRANSFORMER FAULT INDICATING MEANS
Filed June 3, 1938   2 Sheets-Sheet 1
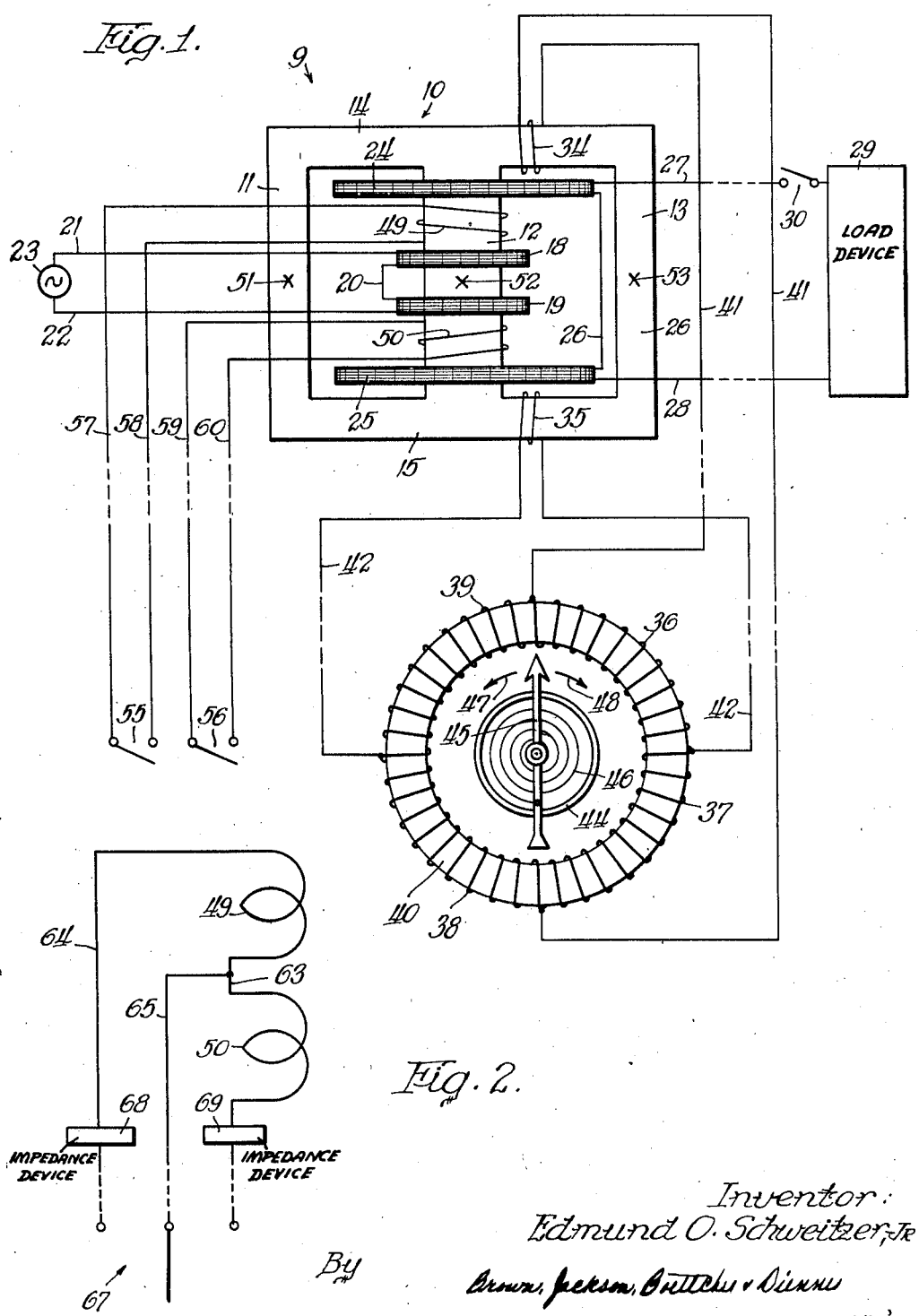
Inventor:
Edmund O. Schweitzer, Jr.

Dec. 24, 1940.     E. O. SCHWEITZER, JR     2,226,021
TRANSFORMER FAULT INDICATING MEANS
Filed June 3, 1938     2 Sheets-Sheet 2

Inventor:
Edmund O. Schweitzer, Jr.
By Brown, Jackson, Boettcher & Dienner
Attys.

Patented Dec. 24, 1940

2,226,021

UNITED STATES PATENT OFFICE 2,226,021

TRANSFORMER FAULT INDICATING MEANS

Edmund O. Schweitzer, Jr., Northbrook, Ill.

Application June 3, 1938, Serial No. 211,517

12 Claims. (Cl. 177—311)

My invention relates, generally, to apparatus for detecting one or more short-circuited turns in a winding energized with alternating current and it has particular relation to apparatus for detecting one or more short-circuited turns in the windings of a transformer, together with means for testing the indicating apparatus.

My present invention constitutes an improvement over the apparatus disclosed in my copending application, Serial No. 100,162, filed September 10, 1936, now Patent No. 2,149,634. In this copending application I have provided for utilizing the change in the magnetic field which is caused by the occurrence of a fault, for example, one or more short-circuited turns in a winding, such as one of the windings of a transformer. Thus, if a short-circuited turn occurs in one of the windings of a single phase transformer that is energized from a suitable source of alternating current, a shifting field will be generated because of the phase displaced currents flowing in the turns of the winding, including the short-circuited turn or turns. The current in the main part of the winding generates a flux in phase therewith. This flux generates a lagging current in the short-circuited turn or turns. The lagging current in the short-circuited turn or turns generates a flux in phase with the short-circuit current but lagging behind the current and flux of the main part of the winding. These out-of-phase fluxes, when space displaced, will produce a shifting field. The resulting shifting field is arranged to induce eddy currents in a movable conductor, for example, a cylinder of copper or aluminum which, by its movement, indicates the presence of the shifting field and by the direction of its movement the general location of the fault.

In my copending application I have also disclosed the manner in which a remote indication can be obtained of the presence of a fault in one of the windings of a transformer. For this purpose instrument windings are spaced apart on a magnetic core which links the windings of the transformer and they are connected by suitable conductors to operating windings which may be located on a magnetic core at the remote point. The indicating cylinder is mounted for movement under the influence of the shifting field generated by the operating windings to indicate by its movement the presence of the fault as soon as it occurs.

It is desirable to provide some means for checking the operation of the fault detecting system disclosed in my copending application, so that the operator can immediately determine whether it is in satisfactory operating condition. If some such means is not provided, there is the possibility that the operator will place reliance upon the proper operation of the fault detecting system when, as a matter of fact, it may not be in satisfactory operation due, for example, to the accidental interruption of one or more of the control conductors interconnecting the instrument windings on the transformer with the operating windings at the remote point. Other accidental circuit or other failures might occur which would render the fault indicating system inoperative, as will be readily apparent to those skilled in the art.

Therefore, the object of my present invention, generally stated, is to provide a simple and economical means for checking the operation of a transformer fault indicating system, which may be readily installed and operated.

An important object of my invention is to simulate a fault in the windings of a transformer or the like for operating a fault indicating system coupled thereto for checking its operation.

Another important object of my invention is to simulate faults at different locations in the windings of a transformer or the like for operating, in either direction, indicating means in a fault indicating system coupled to the windings to check the operatiton of the system.

A further object of my invention is to instantaneously indicate the presence of a short-circuited turn or turns in the windings of a shell type of transformer and to check the operativeness of the system used for so doing.

A still further object of my invention is to instantaneously indicate the presence of a short-circuited turn or turns in the windings of a core type of transformer and to check the operativeness of the system used for so doing.

Other objects of my invention will, in part, be obvious and in part appear hereinafter.

My invention, accordingly, is disclosed in the embodiments hereof shown in the accompanying drawings, and it comprises the features of construction, combination of elements and arrangement of parts which will be exemplified in the constructions hereinafter set forth, and the scope of the application of which will be indicated in the appended claims.

For a more complete understanding of the nature and scope of my invention, reference may be had to the following detailed description, taken in conjunction with the accompanying drawings, in which:

Figure 1 illustrates diagrammatically my fault indicating system and arrangement for testing the same, for use in connection with a shell type of transformer;

Figures 2 and 3 illustrate diagrammatically different circuit arrangements that may be employed for the test windings employed to check the operativeness of the fault indicating system.

Figure 4:
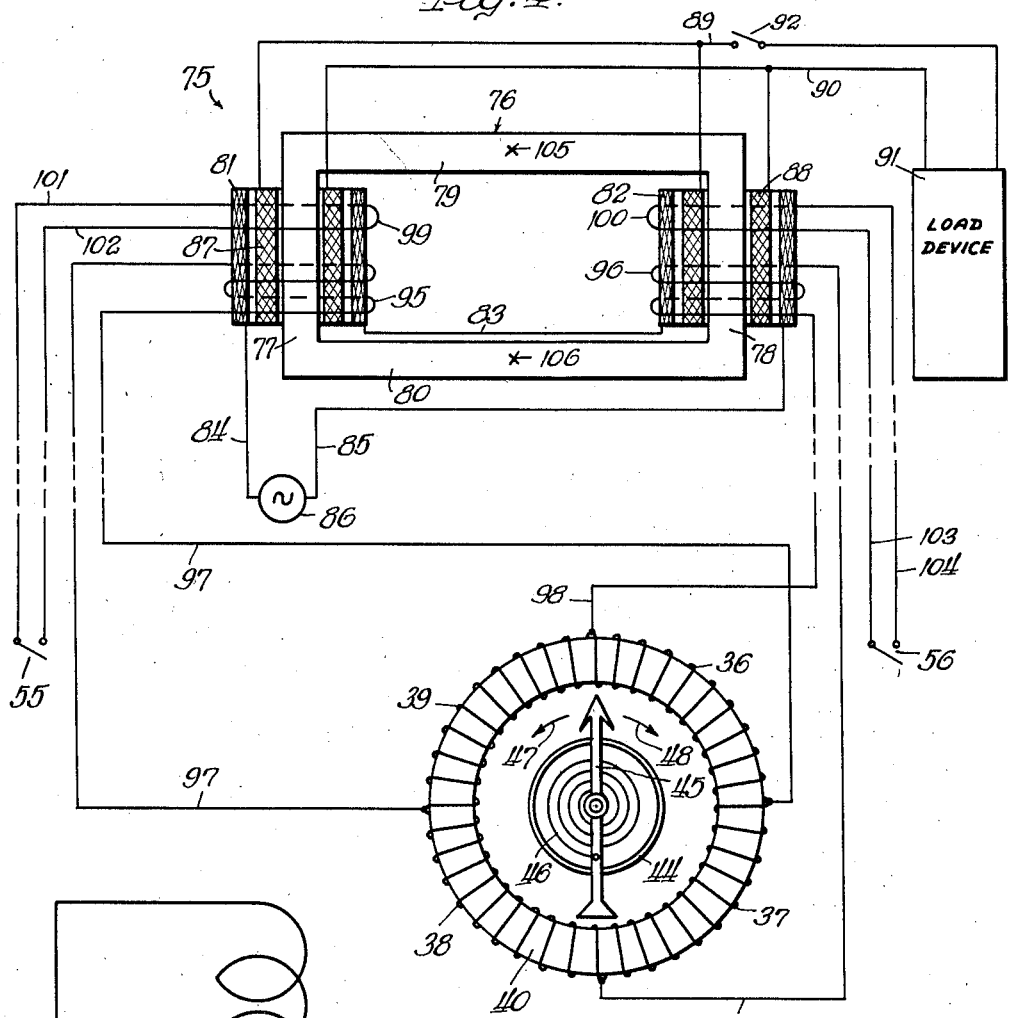
Figure 4 illustrates diagrammatically a fault indicating system for a core type of transformer and the circuits employed for testing the operativeness of the same.

Referring now particularly to Figure 1 of the drawings, it will be observed that the reference character 9 designates, generally, a shell type of transformer having a magnetic core shown generally at 10. The magnetic core 10 is of the three-legged type, comprising legs 11, 12 and 13 interconnected by end members 14 and 15. It will be understood that the core 10 merely illustrates the shell type of construction. In some shell type transformers there is provided additional core material at right angles to the main core 10. For illustrative purposes, this additional core material is omitted.

The middle leg 12 is provided with a primary winding comprising sections 18 and 19 which may be connected in series circuit relation by a conductor 20 and by conductors 21 and 22 connected for energization across a source 23 of alternating current, such as a 60-cycle source. The middle leg 12 is also provided with a secondary winding comprising sections 24 and 25 that may be connected in series circuit relation by a conductor 26 and by means of conductors 27 and 28 connected to energize a suitable load device 29. A switch 30 is provided in the conductor 27 for disconnecting the load device at will. It will be understood that the primary winding formed by the sections 18 and 19 may comprise a single coil, rather than the two sections as illustrated. Likewise, the secondary winding comprising the sections 24 and 25 may be a single coil rather than the two sections. The particular coil arrangement depends upon the size of the transformer and the voltages at which the various windings operate. Other design factors also enter.

As described in my aforesaid copending application, I have provided means for instantaneously detecting the presence of a fault in the windings of a transformer. For example, upon the occurrence of one or more short-circuited turns in the sections 18 and 19 of the primary winding, or in the sections 24 and 25 of the secondary winding, a shifting magnetic field will be created which may be employed to give an indication of the presence of the fault. The presence of the fault may be indicated at the transformer 9. However, it is preferable to indicate it at a remote point, such as a control room, so that the operator can take the necessary steps to disconnect the transformer from service in the event that this is not accomplished automatically by the fault responsive means.

With a view to providing means that is responsive to the shifting flux created as a result of the occurrence of one or more short-circuited turns in either the primary or the secondary windings of the transformer 9, instrument windings 34 and 35 are provided on the core 10. For example, they may be provided, as illustrated, on the end portions 14 and 15. The phase displaced currents in the instrument windings 34 and 35 resulting from the creation of the shifting magnetic field are arranged to produce corresponding phase displaced currents in operating windings 36, 37, 38 and 39 of a Gramme ring that may be located in the control room, as described. The operating windings are wound about a toroidal magnetic core 40, as will be readily undertsood. It will be observed that the instrument winding 34 is connected by conductors 41 across diametrically opposite points of the windings 36, 37, 38 and 39 and that the instrument winding 35 is similarly connected by conductors 42 across diametrically opposite points of these windings. The phase displaced currents in the operating windings 36, 37, 38 and 39 generate a shifting magnetic field which causes eddy currents to flow in a cylinder 44 formed of conducting material such as aluminum or copper and mounted for rotation within the toroidal core 40. The cylinder 44 carries a pointer 45 and is provided with a centering spring 46 to maintain it in a predetermined position when it is not subjected to the shifting magnetic field. It will be understood that the cylinder 44 will be caused to rotate as a result of the interaction between the eddy currents or the flux generated thereby and the flux of the shifting magnetic field. Depending upon the location of the fault in the primary or secondary windings of the transformer 10, the pointer 45 will rotate in one direction or the other as indicated by the arrows 47 and 48. By noting the direction of movement of the pointer 45 it is possible to know generally the location of the fault in the transformer 9.

As indicated hereinbefore, it is desirable to provide some means for checking the operativeness of the fault indicating system so that the operator can be assured at any time that it is in proper operating condition. For this purpose I have provided test windings 49 and 50 which are located unsymmetrically with respect to the primary winding comprising the sections 18 and 19 and the secondary winding comprising the sections 24 and 25. These test windings 49 and 50, when short circuited, cause the rotation of the cylinder 44 and pointer 45 carried thereby in the same manner that short circuited turns in the primary and secondary windings effect the same result.

By positioning the test windings 49 and 50 unsymmetrically with respect to the primary and secondary windings, I mean that they are positioned on the core 10 in any location except those indicated at 51, 52 and 53 in the legs 11, 12 and 13, respectively. If a short-circuited turn is located symmetrically with respect to the primary and secondary windings, which, of course, are usually located symmetrically with respect to each other, as is readily understood by those skilled in the art, then no shifting magnetic field would result, due to the fact that there would be no space displacement of the fluxes generated by the primary and secondary windings and the short-circuited test turns.

By making the primary and secondary windings in the sections 18 and 19 and 24 and 25, respectively, as illustrated, it is possible to so position them that there will be no turns at the neutral point 52 in the middle leg 12. As a result, there will be no possibility of the occurrence of a short-circuited turn in either the primary or the secondary winding which would not be immediately indicated by corresponding movement of the pointer 45. As a practical matter, even when the primary and secondary windings are formed by single coils and symmetrically disposed about the middle leg 12 with the secondary winding adjacent thereto and the primary winding superimposed therearound, it is extremely unlikely that a short-circuited turn would occur at the exact magnetic center of these windings. Ordinarily, a short-circuited turn will occur at one or the other end of the windings where the insulation is the weakest and there is the maximum voltage gradient.

By providing the test winding 49 above the neutral point 52 it is possible, on short-circuiting it, to simulate the occurrence of a short-circuited turn in the section 18 of the primary winding or the section 24 of the secondary winding. The pointer 45 will then move, for example, in the direction indicated by the arrow 47, in the same manner that it would move in the event of the occurrence of a short-circuited turn in either of these sections. Likewise, by providing the test winding 50 below the neutral point 52 and short-circuiting it, the pointer 45 will be rotated in a direction, for example, as indicated by the arrow 48, that is the same as it would be rotated on the occurrence of one or more short-circuited turns in the section 19 of the primary winding or the section 25 of the secondary winding.

For the purpose of short-circuiting the test windings 49 and 50, switches 55 and 56 may be provided at the remote point. The switch 55 is connected across the test winding 49 by conductors 57 and 58 while the switch 56 is connected across the test winding 50 by conductors 59 and 60.

It will now be apparent that by closing the switch 55 the test winding 49 will be short-circuited and the occurrence of a fault in the sections 18 and 24 of the primary and secondary windings, respectively, will be simulated and the pointer 45 will move correspondingly. Likewise, by closing the switch 56 the test winding 50 will be short-circuited and a corresponding movement of the pointer 45 will take place which is the same as would take place on the occurrence of one or more short-circuited turns in the sections 19 and 25 of the primary and secondary windings, respectively.

In Figure 2 of the drawings, a modified arrangement of the test windings 49 and 50 is shown. As there illustrated, the test windings 49 and 50 are commonly connected by a conductor 63. Conductors 64, 65 and 66 are provided for connecting the test windings 49 and 50 to the remote point, conductor 65 being common to both test windings 49 and 50. This arrangement reduces by one the number of conductors required for connection to the remote point. A single pole double throw switch 67 is provided for selectively short-circuiting either the test winding 49 or the test winding 50, as will be readily understood.

It may be desirable for some installations to change the phase angle of the circuits including the test windings 49 and 50. For this purpose, impedance devices 68 and 69 are provided in the conductors 64 and 66, respectively. These impedance devices may comprise either a resistor or an inductor or a capacitor, or any combination of these elements, as may be desired.

In describing and claiming the provision for short-circuiting the test windings, it will be understood that they may be directly short-circuited on themselves or they may be short-circuited through impedances such as would be provided by the impedance devices 68 and 69.

Figure 3:
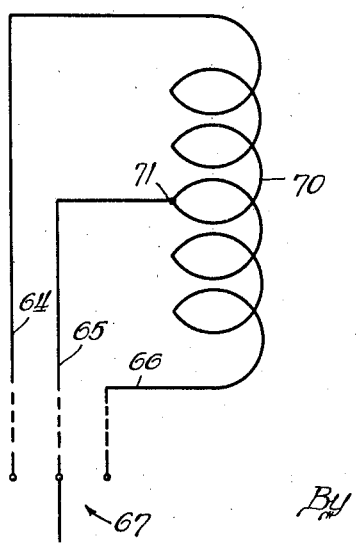

In Figure 3 of the drawings, the single test winding 70 is provided having a center tap 71 in lieu of the two test windings 49 and 50. Conductors 64, 65 and 66 are provided for connecting the single test winding 70 to the remote point where the single pole double throw short-circuit switch 67 is located. It will be understood that the single test winding 70 would be located in such position on the core 10 that the opposite movement of the pointer 45 will be obtained by short-circuiting opposite end portions thereof. For example, the winding 70 could be positioned on the middle leg 12 with the center tap 71 located in proximity to the neutral point 52.

As illustrated in Figure 4 of the drawings, my invention may be applied to a core type transformer. A transformer of this type is indicated generally at 75. It is provided with a magnetic core, shown generally at 76, that is generally rectangular in shape and has end legs 77 and 78 interconnected by top and bottom members 79 and 80. A primary winding comprising sections 81 and 82, connected in series by a conductor 83, is provided on the end legs 77 and 78. These sections 81 and 82 are connected by conductors 84 and 85 across a suitable source 86 of alternating current, such as a 60-cycle source. The transformer 75 is also provided with a secondary winding comprising sections 87 and 88. In the drawings these sections are indicated as being connected in parallel circuit relation across conductors 89 and 90. It will be understood that they can be connected in series circuit relation, if desired. The conductors 89 and 90 are connected to energize a suitable load device 91 through a switch 92.

Instrument windings 95 and 96, corresponding, respectively, to instrument windings 34 and 35, Figure 1, are provided around the end legs 77 and 78, as illustrated. These instrument windings are positioned in the shifting flux that is produced on the occurrence of one or more short-circuited turns in the primary and secondary windings of the transformer 75. They are connected to energize the operating windings 36, 37, 38 and 39 on the toroidal magnetic core 40 by conductors 97 and 98, as indicated. As previously described, a conducting cylinder 44 carrying a pointer 45 and having a centering spring 46 is provided for movement in the directions indicated by the arrows 47 and 48 on the occurrence of a short-circuited turn or turns in the transformer 75. If a fault exists in the primary or secondary windings on the leg 77, the pointer 45 will be moved in one direction, for example, in the direction indicated by the arrow 48. Likewise, if the fault exists in the windings on the other leg 78, the pointer 45 will move in the direction indicated by the arrow 47.

With a view to checking the operativeness of the fault indicating system, test windings 99 and 100 are provided around the legs 77 and 78, respectively. Switches 55 and 56 are provided at the remote point, as previously described, for permitting selective short-circuiting of the test windings 99 and 100. As shown, the switch 55 is connected across the test winding 99 by conductors 101 and 102, while the switch 56 is connected across the test winding 100 by conductors 103 and 104. On closing the switch 55, the pointer 45 will move in the same direction that it moves when a fault occurs in either the section 81 of the primary winding or the section 87 of the secondary winding. In like manner, on the closing of the switch 56, the pointer 45 will be moved in the same direction that it is moved when a fault occurs in the section 82 of the primary winding or the section 88 of the secondary winding on the leg 78.

In a core type of transformer the neutral points are in the top and bottom members, as indicated at 105 and 106. These points are midway between the windings on the end legs 77 and 78. Since the neutral points are located as indicated, there will be an indication of a short-circuit at any point along any of the sections of the primary or secondary windings with undiminished force. The possibility of a short-circuited turn occurring at the exact magnetic center of any of the primary or secondary windings is not present, since there are no turns located in such position.

While the test windings 99 and 100 have been illustrated as being individually connected to switches 55 and 56 by separate conductors, it will be understood that the circuit connections shown in Figure 2 and described hereinbefore may be employed in lieu thereof.

Since certain further changes may be made in the foregoing constructions and different embodiments of the invention may be made without departing from the scope thereof, it is intended that all matter shown in the accompanying drawings or described hereinbefore shall be interpreted as illustrative and not in a limiting sense.

I claim as my invention:

1. In combination; a main winding, energized with alternating current accompanied by a normal flux, subject to undesirable short circuit which causes a shifting of at least part of the normal flux due to space and phase displaced short circuit currents; auxiliary winding means inductively related to and positioned unsymmetrically with respect to said main winding; switch means connected across said auxiliary winding means to permit short circuiting the same at will; and short circuit responsive means actuated by the shifting flux resulting either from the occurrence of an undesirable short circuit in said main winding or from closing said switch means.

2. In combination; a main winding, energized with alternating current accompanied by a normal flux, subject to undesirable short circuit accompanied by an abnormal flux displaced in space and time from the normal flux; a test winding inductively related to and positioned unsymmetrically with respect to said main winding; switch means connected across said test winding to permit short circuiting the same at will to produce a test flux displaced in space and time from said normal flux; and means responsive to the combined action of either said normal and abnormal fluxes or said normal and test fluxes.

3. In combination; main winding means, energized with alternating current accompanied by a normal flux, subject to undesirable short circuit on either side of its center which causes a shifting of at least part of the normal flux in either direction due to space and phase displaced short circuit currents; a pair of auxiliary windings positioned in inductive relation to and on opposite sides of the center of said main winding means; switch means connected across each auxiliary winding to permit short circuiting of the same at will to produce auxiliary fluxes displaced in space and phase from said normal flux; and short circuit responsive means actuated by the shifting flux resulting either from the occurrence of an undesirable short circuit in said main winding means on either side of its center or from closing either of said switch means.

4. In combination; main winding means, energized with alternating current accompanied by a normal flux, subject to undesirable short circuit on either side of its magnetic center accompanied by abnormal fluxes displaced in space and time from the normal flux; a pair of test windings positioned in inductive relation to and on opposite sides of the magnetic center of said main winding means; switch means connected across each test winding to permit short circuiting the same at will to produce test fluxes displaced in space and time from said normal flux; and means responsive to the combined actions of either said normal and abnormal fluxes or said normal and test fluxes.

5. In combination; main winding means, energized with alternating current accompanied by a normal flux, subject to undesirable short circuit on either side of its center which causes a shifting of at least part of the normal flux in either direction due to space and phase displaced short circuit currents; a pair of auxiliary windings positioned in inductive relation to and on opposite sides of the center of said main winding means; switch means located at a remote point and connected across each auxiliary winding to permit short circuiting of the same at will to produce auxiliary fluxes displaced in space and phase from said normal flux; polyphase coil means in the fluxes; phase difference responsive means at said remote point; and circuit means interconnecting said polyphase coil means and said remotely disposed phase difference responsive means.

6. In combination; main winding means, energized with alternating current accompanied by a normal flux, subject to undesirable short circuit on either side of its magnetic center accompanied by abnormal fluxes displaced in space and time from the normal flux; a pair of test windings positioned in inductive relation to and on opposite sides of the magnetic center of said main winding means; switch means located at a remote point and connected across each test winding to permit short circuiting the same at will to produce test fluxes displaced in space and time from said normal flux; magnetic core means linking said main winding means and said test windings for induction therein of the phase displaced fluxes; polyphase winding means on said magnetic core means connected to another polyphase winding means at said remote point; and means responsive to the shifting flux generated by said other polyphase winding means either on the occurrence of a short circuit on either side of the magnetic center of said main winding means or on the closing of either of said switch means.

7. In combination; a three legged magnetic core, winding means around the middle leg of said core energized with alternating current accompanied by a normal flux, subject to undesirable short circuit accompanied by abnormal flux displaced in space and time from the normal flux; a test winding around said core in a position unsymmetrical with respect to said winding means; switch means connected across said test winding to permit short circuiting the same at will to produce a test flux displaced in space and time from said normal flux; and means responsive to the combined action of either said normal and abnormal fluxes or said normal and test fluxes.

8. In combination; a shell type transformer having a three legged magnetic core with primary and secondary windings symmetrically disposed on the middle leg, energized from an alternating current source accompanied by normal fluxes, and subject to undesirable short circuits accompanied by abnormal fluxes displaced in space and time from the normal fluxes; a test winding on said core in a position unsymmetrical with respect to said primary and secondary windings; switch means located at a remote point and connected across said test winding to permit short circuiting the same at will to produce a test flux displaced in space and time from said normal fluxes; polyphase winding means on said magnetic core connected to another polyphase winding means at said remote point; and means responsive to the shifting flux generated by said other polyphase winding means in response to the combined action of either said normal and abnormal fluxes or said normal and test fluxes.

9. In combination; a shell type transformer having a three legged magnetic core with primary and secondary windings symmetrically disposed on the middle leg, energized from an alternating current source accompanied by normal fluxes, and subject to undesirable short circuits on either side of their magnetic centers accompanied by abnormal fluxes displaced in space and time from the normal fluxes; a pair of testing windings around said core on opposite sides of the magnetic centers of said primary and secondary windings; switch means located at a remote point and connected across each test winding to permit short circuiting the same at will to produce test fluxes displaced in space and time from said normal fluxes; polyphase winding means on said magnetic core connected to another polyphase winding means at said remote point; and means responsive to the shifting flux generated by said other polyphase winding means either on the occurrence of a short circuit on either side of the magnetic center of either said primary or said secondary winding or on the closing of either of said switch means.

10. In combination; a generally rectangular magnetic core, winding means on opposite legs of said core energized with alternating current accompanied by a normal flux, subject to undesirable short circuit accompanied by abnormal flux displaced in space and time from the normal flux; a test winding on said core; switch means connected across said test winding to permit short circuiting the same at will to produce a test flux displaced in space and time from said normal flux; and means responsive to the combined action of either said normal and abnormal fluxes or said normal and test fluxes.

11. In combination, a core type transformer having a generally rectangular magnetic core with primary and secondary windings symmetrically disposed on two opposite legs, energized from an alternating current source accompanied by normal fluxes, and subject to undesirable short circuits accompanied by abnormal fluxes displaced in space and time from the normal fluxes; a test winding on said core; switch means located at a remote point and connected across said test winding to permit short circuiting the same at will to produce a test flux displaced in space and time from said normal fluxes; polyphase winding means on said magnetic core connected to another polyphase winding means at said remote point; and means responsive to the shifting flux generated by said other polyphase winding means in response to the combined action of either said normal and abnormal fluxes or said normal and test fluxes.

12. In combination; a core type transformer having a generally rectangular magnetic core with primary and secondary windings symmetrically disposed on two opposite legs, energized from an alternating current source accompanied by normal fluxes, and subject to undesirable short circuits accompanied by abnormal fluxes displaced in space and time from the normal fluxes; a test winding on each of said opposite legs of said core; switch means located at a remote point and connected across each test winding to permit short circuiting the same at will to produce test fluxes displaced in space and time from said normal fluxes; polyphase winding means on said magnetic core connected to another polyphase winding means at said remote point; and means responsive to the shifting flux generated by said other polyphase winding means in response to the combined action of either said normal and abnormal fluxes or said normal and test fluxes.

EDMUND O. SCHWEITZER, Jr.